Figure 3A:
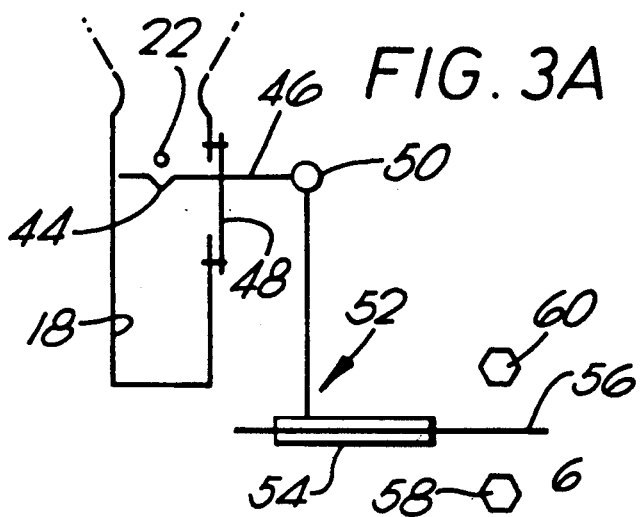

United States Patent [19]

Peck et al.

[11] Patent Number: 5,010,678

[45] Date of Patent: Apr. 30, 1991

[54] BITE INDICATORS

[76] Inventors: Jeffrey A. Peck, 53 Thackery Road, Larkfield, England; William R. Thurston, 15 Harold Road, Hawley, Dartford, England, DA2 7SA

[21] Appl. No.: 354,130

[22] Filed: May 19, 1989

[30] Foreign Application Priority Data

Jan. 19, 1989 [GB] United Kingdom ............... 8901170

[51] Int. Cl.⁵ .............................................. A01K 97/12
[52] U.S. Cl. ...................................................... 43/17
[58] Field of Search ............................. 43/16, 17, 21.2

[56] References Cited

U.S. PATENT DOCUMENTS

| 3,020,664 | 2/1962 | Snyder | 43/17 |
| 4,485,578 | 12/1984 | Novey | 43/21.2 |
| 4,731,946 | 3/1988 | Blythe | 43/17 |

FOREIGN PATENT DOCUMENTS

| 3644165 | 7/1988 | Fed. Rep. of Germany | 43/17 |
| 2472916 | 7/1981 | France | 43/17 |
| 2021911 | 12/1979 | United Kingdom | 43/17 |
| 1596260 | 8/1981 | United Kingdom | 43/17 |
| 2170382 | 8/1986 | United Kingdom | 43/16 |

Primary Examiner—Kurt Rowan
Attorney, Agent, or Firm—Bauer & Schaffer

[57] ABSTRACT

Apparatus for sensing movement of a fishing line when a fish takes the bait on the line is described and includes a casing fittable to bank rod at a desired angle and having an opening for receiving a fishing rod and a slot which receives the fishing line. A stylus part of a sensor extends into the slot and the slot walls may be shaped to guide the line into engagement with the stylus. The stylus passes through a water resistant/impermeable sheath into the casing in which it is coupled to a sensing device operable to generate or modulate a voltage when it is moved or vibrated. An electronic circuit is provided in the casing to generate a audible and visible indication of line movement and includes a tone sounder carried in and LEDs mounted on the casing.

The sensing device may comprise a piezo-electric device or a vibration sensitive switch operable to generate a voltage when vibrated, or a (infra red) light source/sensor arrangement including a light modulating element attached to the stylus.

The electronic circuit includes a transistor switch operable in response to the sensor output to enable LED and tone sounder driver circuits. The output of the sensor maybe amplified and (manual) switch means may be provided operable to latch the transistor in a conductive state.

Variable resistors are provided for the (manual) adjustment of the pitch and volume of the audible output and the sensitivity of the indicator and means may be included for increasing this sensitivity for a period following a bite.

An LED and the tone sounder driver may comprise free running oscillators.

18 Claims, 4 Drawing Sheets

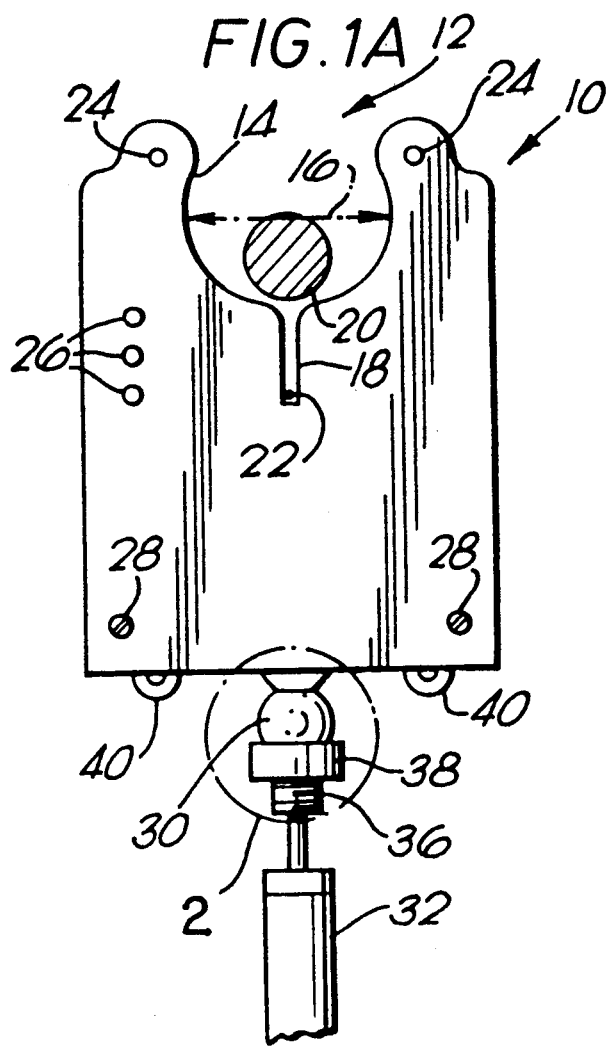
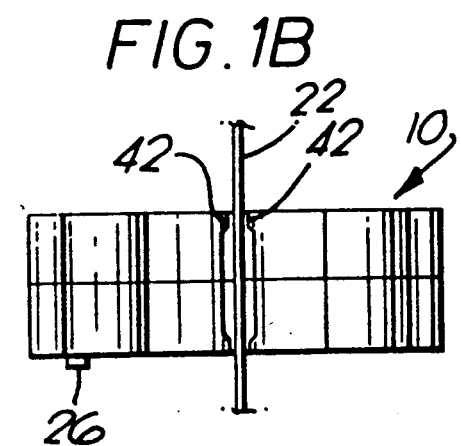
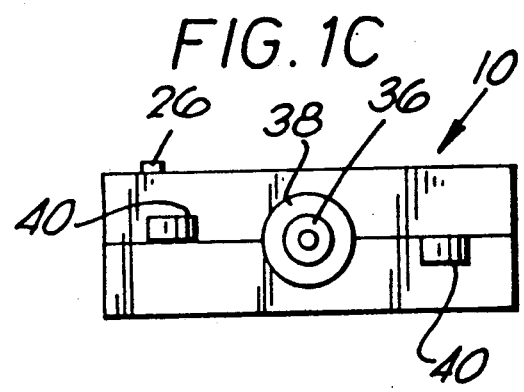
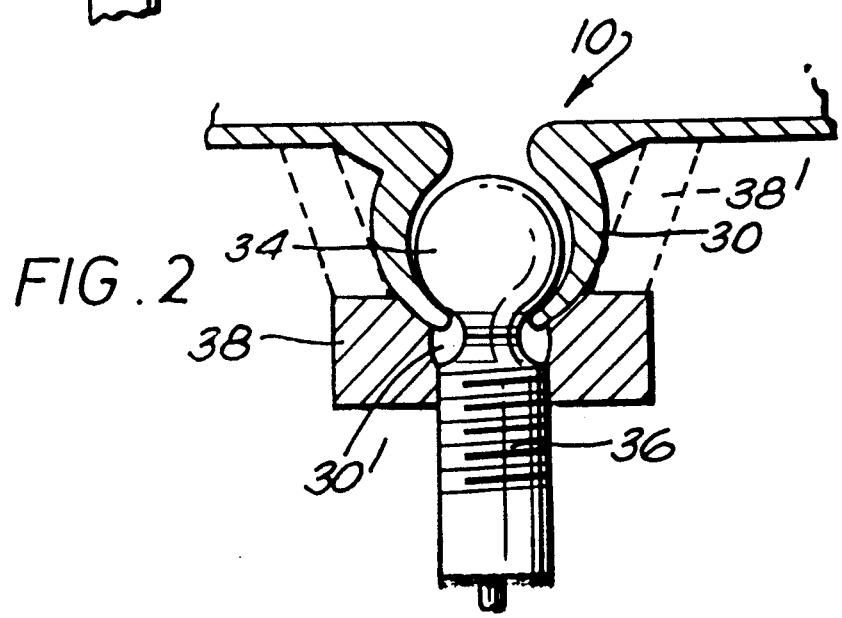

5,010,678

BITE INDICATORS

DESCRIPTION

The invention relates to bite indicators, in particular bite indicators for indicating to an angler that a fish has taken the bait on a fishing line.

It is often difficult (particularly at night) for an angler to determine if a fish is taking the bait on a fishing line he is using and to this end many attempts have been made to provide devices which will indicate by audible and/or visible means to the angler that he has a "bite". Traditionally these have included mechanical means (e.g. a bell simply hung on the line which is moved and is rung when the line moves, or electro-mechanical devices triggered by line movement to ring a bell and-/or energise a light).

More recently electronic bite indicators have been proposed which incorporate a wheel or pulley about which the line is passed, which is caused to move when a fish takes the bait and runs with the line and the movement of which is monitored.

One difficulty found with all the bite indicators known to us at present is the difficulty of adjusting the sensitivity of the bite indicators known to us to take account of different conditions in waters being fished — it will be appreciated that if still waters are being fished the sensitivity of the bite indicator can and should be significantly higher that is desirable if fast running waters are being fished. Another is the drag they impart to the line which can deter a fish from taking the bait, and a third is the propensity for bite indicators having moving parts to freeze solid in cold, e.g. freezing fog, conditions.

A difficulty of the electronic bite indicators known to us which rely on the line moving a member (e.g. a wheel) and then electronically sensing movement of the member is in the long term reliability of the device — the moving parts being subject to friction and wear — and in the susceptibility of such devices to ingress of water — it difficult to adequately seal and waterproof the electronic sensing system coupled to the member being moved and used to sense its motion.

Objects of the invention include the provision of a bite indicator which alleviates and/or overcomes the noted and other difficulties found with the bite indicators known to us.

In one aspect the invention provides a fishing bite indicator including means for guiding a fishing line along a path in which it runs adjacent to or in abutment with a sensor operable to generate or modulate an electrical signal when moved, means for monitoring the output of the sensor and for generating an audible and-/or visual indication upon generation or modulation of a electrical signal by said sensor.

Said sensor preferably comprises a sensing device operable to generate or modulate a voltage when it is moved or vibrated and which is mounted in a sealed case shaped to support a fishing rod and is provided with a stylus passing through a water resistant or impermeable sheath means to a position in which movement of a fishing line associated with the rod will cause movement of the stylus.

Said sensing device may comprise a piezo-electric crystal operable to generate a voltage when it is moved or vibrated. Alternatively said sensing device may comprise a vibration sensitive switch operable to generating a voltage when it is moved or vibrated. Again, said sensing device may comprise a light source and a light sensor the electrical output voltage of which is proportional to light incident thereon, the sensor being arranged to receive light from the light source via a light transmitting or reflecting element the position of which varies when the fishing line is moved so as to vary the level of light incident on the light sensor and thereby modulate its electrical output.

In one embodiment said sensing device comprises an infra red light source arranged to illuminate an infra red light sensor via a transparent member having formed thereon an opaque pattern of lines, the transparent member being carried by said stylus and movable therewith upon movement of a fishing line supported by the bite indicator.

Desirably, the casing is formed with an opening within which in use a fishing rod rests, the opening comprising a mouth part through which the rod may pass, a wider part within which the rod rests and a narrow slot formation which receives the line associated with the rod and within which the said stylus extends.

The slot walls may be shaped to guide the fishing line into a path in which it abuts the stylus.

The indicator may include a freely rotatably mounted cam positioned to engage the fishing line and cause movement thereof in a direction substantially orthogonal to the direction of movement of the line across the stylus. In this way the output of the sensor may be increased. It is possible if desired for the cam to be positoned to engage the stylus and cause movement thereof when the cam is rotated by movement of the fishing line.

Preferably, said means for providing a visual indication of line movement comprises one or more light emitting diodes mounted on the casing adjacent the mouth part of said opening.

The casing may have means enabling its attachment to a bank stick at an angle to the axis thereof such that the casing may be mounted vertically irrespective of the disposition of the bank stick. These attachment means may desirably comprise a ball and socket joint parts of which are formed on the casing and the bank stick respectively and which are lockable in a desired position by adjustment of a collar member. In a desired embodiment the attachment means comprises a socket formed as part of the casing and for receiving a ball member mounted on the bank stick, the collar member being threadably mounted on the bank stick adjacent the ball member.

It is preferred that the means for monitoring the output of said sensor comprises an electronic circuit to which the sensor is electrically coupled and which incorporates at least one light emitting diode and driver circuit(s) therefor and a tone sounder and a driver circuit therefore, which driver circuits are activated in response to an electrical output from the sensor to energise the or each light emitting diode and the tone sounder so as to generate an audible and a visual indication of movement of the said stylus.

The electronic circuit is preferably operable in response to the output of the sensor to cause activation of switch means enabling the light emitting diode and tone sounder driver circuits.

The electronic circuit may include an amplifier for the output of the sensor, the amplified signal so obtained being used to cause activation of said switch means.

In one advantageous embodiment the switch means comprises a transistor switched between conductive and non-conductive states in response to the output of said sensor. Further switch means may be provided which are operable to latch the transistor in a conductive state, said further switch switch means desirably comprising a manual switch operable by a user of the indicator.

With advantage the indicator further includes means enabling adjustment of the sensitivity of the circuit to the output of the sensor, said adjustment means comprising a variable resistor in the circuit which variable resistor may be varied by movement of an adjusting element accessable by an angler from the exterior of the casing. The indicator circuit may include means increasing its sensitivity for a predetermined period of time following its activation, this sensitivity means comprising a capacitor which discharges in said predetermined period of time and which acts whilst charged to bias the transistor switch means conductive.

Embodiments of the invention provide free running oscillator circuits for driving one or both light emitting diodes and the tone sounder, which circuits are enabled in response to the output of the sensor. One or both light emitting diode driver circuits may comprise at least two invertors the outputs of which are connected across the light emitting diode, the inputs of which invertors are biased such that the light emitting diode lights for a short period each time the transistor switch means is driven conductive.

The tone sounder driver circuit preferably comprises a free running oscillator circuit biased operative and inoperative in response to the output of the sensor. Advantageously, the tone sounder driver circuit comprises variable resistors enabling both the volume and the tone of the sound emitted by the tone sounder to be adjusted by a user, which resistors are adjustable to vary the oscillation rate of the free running oscillator circuit and the amplitude of the output thereof and which are adjustable by movement of adjusting elements accessable by an angler from the exterior of the casing.

Figure 7:
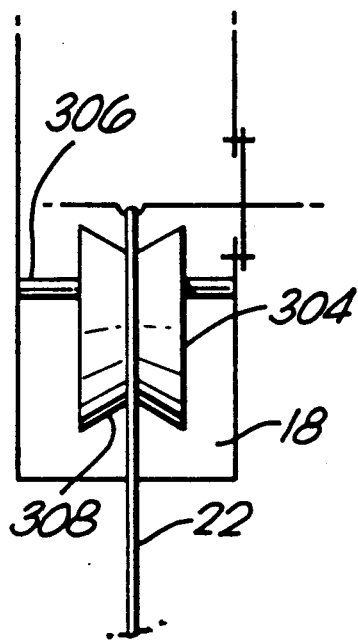
Figure 3B:
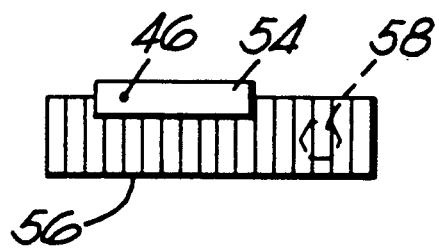
Figure 5:
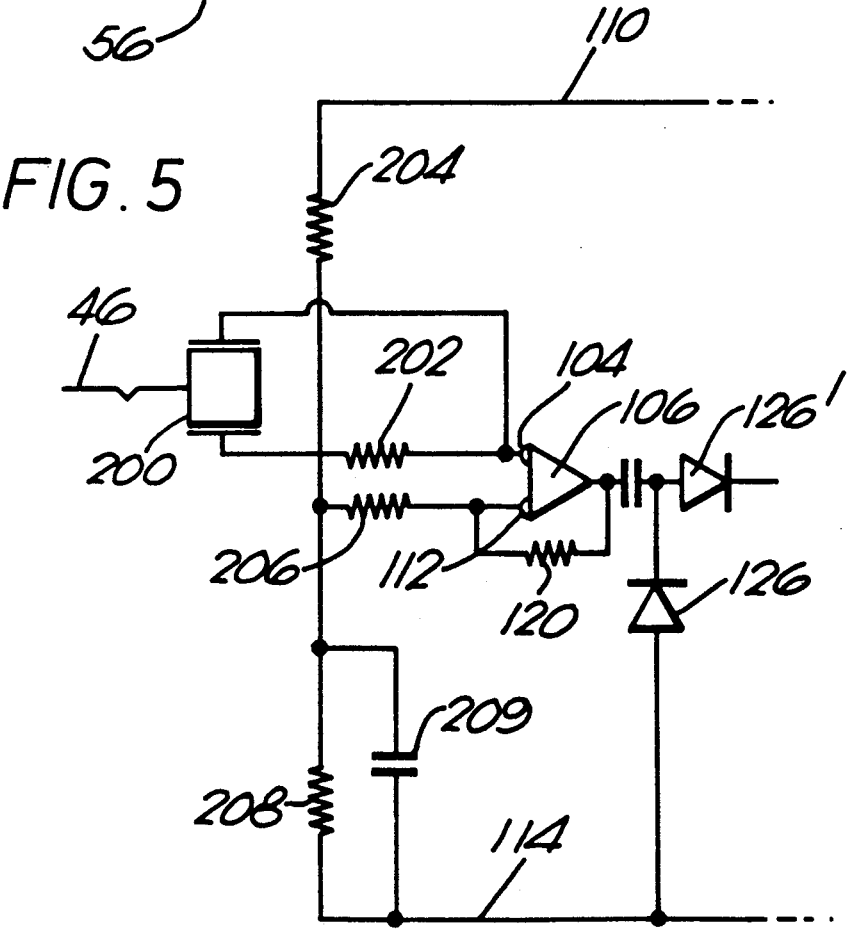
Figure 4:
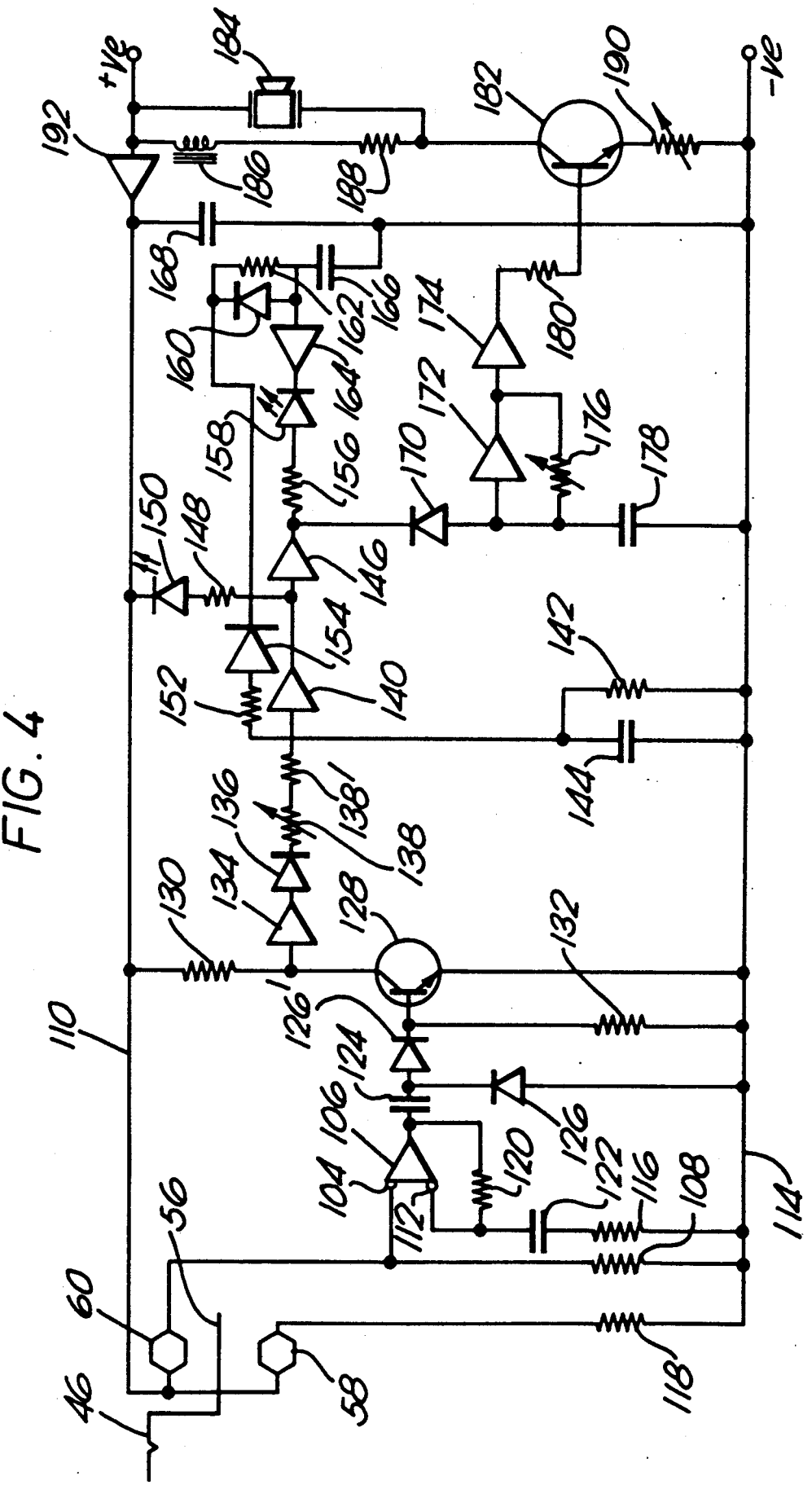
Figure 6:
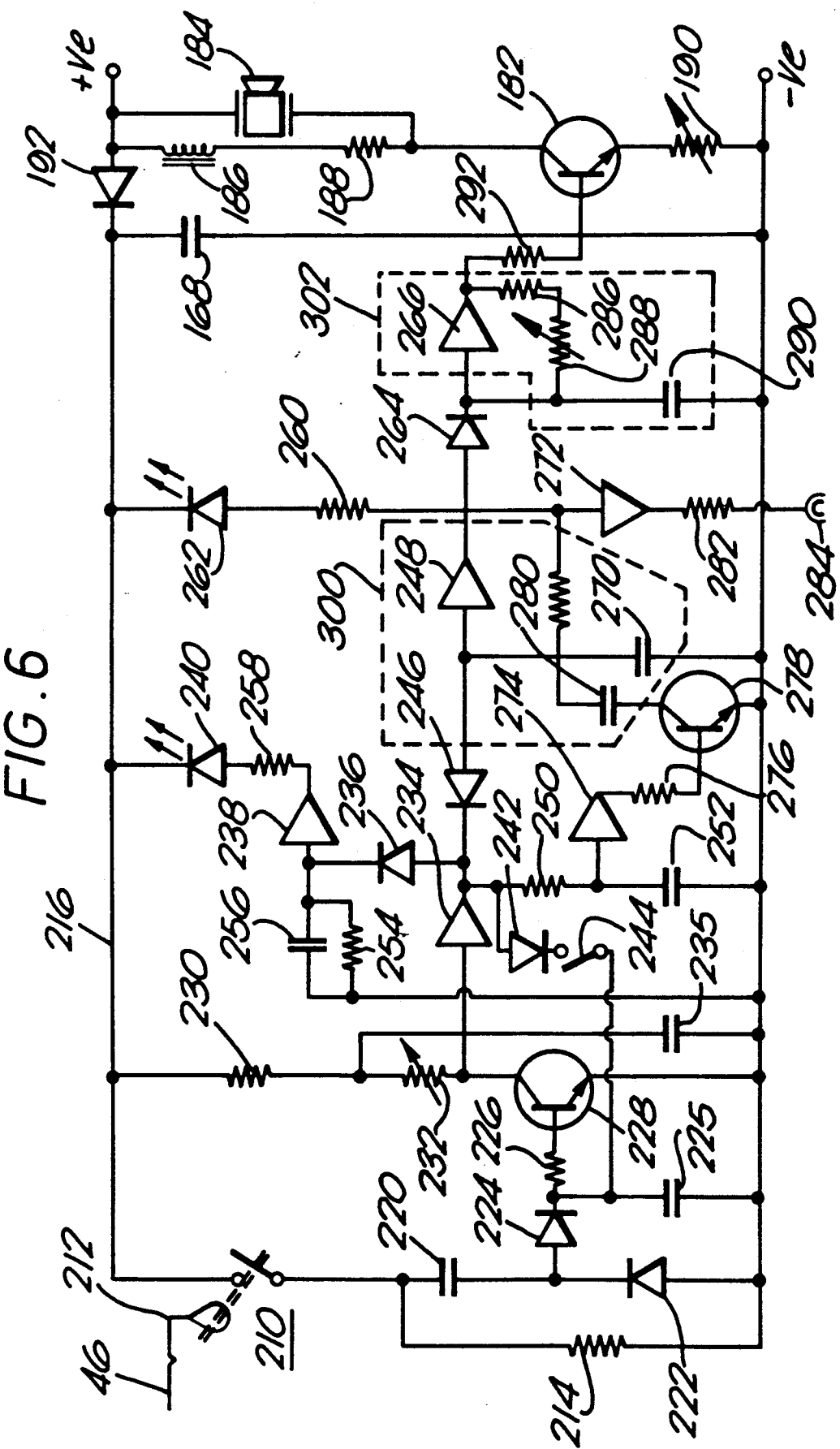

Other aspects features and advantages of the invention will become apparent from the following description of various embodiments of the invention made with reference to the accompanying drawings in which:

FIG. 1 shows at A a face view of a bite indicator embodying the invention and at B and C plan and underneath plan views of the bite indicator respectively, FIG. 2 is a view to an enlarged scale of the part indicated at II in FIG. 1A, FIG. 3A and 3B illustrates one form of sensing device which may be included in the indicator of FIG. 1, FIG. 4 schematically illustrates an electronic circuit embodying the invention incorporating a sensing device as illustrated in FIG. 3, FIG. 5 illustrates at A a second form of sensing device which may be included in the indicator of FIG. 1 and at B its method of connection in the circuit of FIG. 4, FIG. 6 schematically illustrates another electronic circuit embodying the invention incorporating a third form of sensing device, and FIG. 7 illustrates a modified form of the indicator shown in FIG. 1, As can be seen from FIG. 1 the bite indicator comprises a case 10 the upper part of which includes an opening 12 shaped as shown — that is to say it opens from a mouth 14 at the uppermost edge of case 10 to a widest extent at 16 and then narrows again and terminates in a narrow slot 18 extending vertically down the casing as shown. Mouth 14 is sufficiently wide to receive a fishing rod 20 which in use lies in the opening 12 with the fishing line 22 thereon passing along the narrow slot 18.

A main face of the bite indicator shown carries two light emitting diodes (LEDs) as indicated at 24 and the casing is preferably provided with knobs 26 which may be used to adjust the sensitivity or other characteristics of the bite indicator as will be described below.

The case 10 is provided in two halves which are fixable together by means of screws 28. When joined in this way waterproof gaskets (not shown) are interposed between the two halves of the casing so that the interior of the indicator is protected from water.

The bottom of case 10 is provided with a hollow socket 30 integral therewith which may be used to lock the case onto a bank stick 32 as shown in more detail in FIG. 2.

The hollow socket 30 receives a ball 34 having a neck leading to a threaded stem 36 passing through an aperture 30' considerably wider than the neck. A collar 38 is threadably mounted on the stem 36 and can be screwed up and down the threaded portion thereof. The upper inner surface of the collar 38 is shaped to conform with the shape of the lower outer surface of the socket 30 and it will be seen the collar may be screwed up the threaded portion of stem 36 until the stem is fixed in position — the ball 34 and collar 38 being clamped on the inner and outer walls of the socket 30. The stem 36 may be secured at any suitable angle to the bank stick 32 (e.g. with a ferrule as shown). If it desired to mount the bite indicator 10 with its axis in line with that if the bank stick a locking ring 38' may be provided (as shown in dotted outline in FIG. 2) between collar 38 and the bottom of the bite indicator.

The bottoms of the two halves of the 10 are formed with a pair of lugs 40 through which a user may if desired pass a line or wire acting to secure the bite indicator.

The walls of the narrow slot 18 through which the fishing line 22 passes may be formed with flanges 42 as shown (FIG. 1B) which act to ensure the fishing line 22 is accurately centered as it passes down the slot and is brought into its desired operational position — that is to say resting in the V-notch 44 of a thin wire stylus 46 (FIG. 3) of a movement sensor incorporated in the bite indicator.

The wire stylus 46 passes from the slot into the casing through water impermeable flexible plastics or rubber sheath(es) 48 as shown and the end of it within the casing is fixed (e.g. soldered or glued) to a sensing device mounted within the casing (various such devices will be described below). The sensing device — when vibrated or moved by the stylus in response to movement of the fishing line — causes an electronic circuit (to be described below) within the casing to activate the LEDs on the casing and a tone sounder carried within the casing.

The material of the casing 10 is preferably of a suitably strong moudable plastics material such as Nylon or ABS — with the ball 34, stem 36 and collar 38 desirably of brass.

Embodiments of the invention provide that different forms or types of sensing device may be used in the bite indicators and one of these is illustrated in FIG. 3.

In the arrangement of FIG. 3 the stylus 46 is pivotably mounted at 50 in the casing 10 and the lower end 52 of it (as viewed in the Figure) is formed with a moulded nylon clip or clamp 54 which in turn carries a transparent plastics sheet element 56 upon which is an array of opaque (black) lines.

Within the casing element 56 is supported by the stylus 46 between an infra red light source 58 and an infra red light sensor 60 the output voltage of which is proportional to the level of infra red light incident thereon. It will be appreciated that the monitored output voltage of light sensor 60 will be constant whilst the element 56 is still but will vary as the element moves so as to alter the amount of light from source 58 falling on a light sensor 60.

One form of electronic circuit with which the sensing device of FIG. 3 may be used is illustrated in FIG. 4 which schematically shows stylus 46 carrying the plate 56 between the light source 58 and the sensor 60.

The sensor 60 is coupled as shown to form one input 104 of a two input amplifier 106.

Input 104 of amplifier 106 is connected via the light sensor 60 to a line 110 connected to the positive side of a 9 Volt battery (not shown) which is mounted with the casing 10 and supplies power to the circuit, and the other input 112 of amplifier 106 is connected to a line 114 coupled to the negative side of the battery via a resistor 116 and capacitor 122. The input 104 of amplifier 106 is also connected down to the negative supply line by a resistor 108 as shown. The infra red light source 58 is coupled across the lines 110 and 114 in series with a resistor 118.

It will be appreciated that with the configuration shown and in the "steady state" — that is to say when the fishing line is not moving and the element 56 is still — the output of sensor 60 is a steady DC Voltage and the output of amplifier 106 is also a steady DC voltage in the range of 3-4 volts.

The current gain of amplifier 106 is determined by resistor 116 and a resistor 120 which shunts amplifier 106 as shown, and its frequency gain is determined by the capacitor 122.

The output of amplifier 106 is fed via a blocking capacitor 124 to the junction of a pair of diodes 126 and 126' connected as shown to act as a diode pump and provide half wave rectification of the output of amplifier 106 passed by capacitor 124.

Diode 126' is connected to the base of a transistor 128 the collector and emitter of which are connected between the positive and negative supply lines 110 and 114. A resistor 130 is connected as shown between the collector of transistor 128 and the line 110. A resistor 132 is provided coupled between the base of transistor 128 and the negative power supply line 114 as shown. The collector of transistor 128 is further connected as shown to the input of an invertor 134 the output of which is connected via a diode 136, variable resistor 138 and fixed resistor 138' to one input of an invertor 140. The input of invertor 140 is coupled to the negative supply line 114 by a resistor 142 and capacitor 144 as shown. The output of invertor 140 is coupled to the input of an invertor 146 and to the positive supply line 110 via a resistor 148 and LED 150 as shown. Invertor 140 is shunted by a resistor 152 and diode 154 as shown.

The output of invertor 146 is coupled by a resistor 156 to one input of a light emitting diode 158.

The output of invertor 140 is also coupled via a diode 160 and resistor 162 to the input of a third invertor 164 the output of which is connected to an LED 158. The input of invertor 164 is also connected to the negative power supply line 114 by capacitor 166 and a coupling capacitor 168 is connected across the power supply lines 110 and 114 as shown.

The output of invertor 146 is further connected to a free running oscillator circuit via a diode 170. The free running oscillator circuit comprises an invertor 172 driving another invertor 174, a variable resistor 176 shunting invertor 172, and a capacitor 178 connecting the junction of diode 170 and the input of invertor 172 to the negative power supply line 114. The frequency of the free running oscillator circuit is set by variable resistor 176, and the period for which it will operate is as will be described below determined by the capacity of capacitor 178.

The output of the free running oscillator circuit is provided at the output of invertor 174 which is coupled by a resistor 180 to the base of a transistor 182 in turn connected to drive a piezo electric tone sounder 184.

Tone sounder 184 is coupled in parallel with an inductor 186 and resistor 188 in the collector circuit of transistor 182 as shown and a variable resistor 190 in the emitter circuit of this transistor is provided to enable control of the the amount by which transistor 182 is driven conductive by the output of free running oscillator circuit and so the volume of the output of tone sounder 184. Variable resistor 176 controls the frequency at which the free running oscillator circuit runs and thereby the tone of emitted sound. The variable resistors 190 and 176 are adjustable from outside the casing 10 by adjustment of knobs 26.

A diode 192 is provided in line 110 as shown which acts, with capacitor 168 to hold that line at the positive supply voltage (9 volts DC) when transistor 182 is conducting and tone sounder 184 is sounding.

When the element 50 is still (the fishing line is not moving) the steady DC Voltage produced by sensor 60 acts with resistors 108 and 116 to hold the output of amplifier 106 at a steady 3-4 V DC. The voltage on the base of transistor 128 is therefore 0 V DC and transistor 128 is biased OFF. The input of invertor 134 is therefore 9 V DC (the voltage on line 110) and its output is therefore at 0 V DC (logical ZERO). Thus the input of invertor 140 is a logical Zero (at which level it is held by resistor 142) and its output is a logical ONE. In this condition LED 150 has no resultant bias across it and does not light. At the same time the inputs to invertors 146 and 164 are held at a logical ONE and their outputs at logical ZERO's, with the result that there is no bias across LED 158 and it does not light.

The logical ZERO (0 V DC) output of invertor 146 has the effect of forward biasing diode 170 which remains conductive ensuring capacitor 178 is held discharged and preventing the free running oscillator circuit operating.

When the fishing line moves the DC Voltage output of sensor 60 varies and this is fed to input 104 of amplifier 106 which in turn generates an amplified varying voltage at its output. This output is passed by capacitor 124 and the signal is half wave rectified by diode 126 and diode 126' to provide a DC voltage on the base of transistor 128 turning transistor 128 ON. Diode 136 is biased to conduct charging capacitor 144 and bringing the input of invertor 140 up to a logical ONE with the result that the output of this invertor switches to a logical ZERO.

As a result of this change in output of invertor 140 LED 150 is lit and the outputs of invertor 146 and 164 go to a logical ONE voltage level (keeping no resultant bias across LED 158). Whilst the output of invertor 146 is at a logical ONE diode 170 is reverse biased allowing capacitor 178 to charge which in turn enables the free running oscillator circuit to oscillate causing tone sounder 184 to emit sound.

As soon as voltage on the output of invertor 140 is low enough to forward bias diode 154 this diode begins to conduct discharging capacitor 144 until the input to invertor 140 is again at a logical ZERO and its output switches to a logical ONE with the result that LED 150 is no longer lit. The output of invertor 146 goes to a logical ZERO discharging capacitor 178 and disabling the tone sounder 184, at this time the input to invertor 164 is held at logical ZERO voltage keeping the output of invertor 164 at a logical ONE and so LED 158 is switched ON and emits light.

The sensitivity of the bite indicator is adjustable by variation of the setting of the variable resistor 138 and the setting of this resistor may be adjusted by an angler using the bite indicator by varying the setting of a knob 26 on the outside of the casing 10 of the indicator. The values of resistor 142, capacitor 144 and resistor 152 are selected such that as long as transistor 128 is conducting the LED's 150 and 158 are flashing alternately and the tone sounder 184 is driven by the free running oscillator circuit to sound.

If the fishing line stops moving the output voltage of sensor 60 stabilises, transistor 128 is switched OFF, the input to invertor 134 rises to a logical ONE and its output falls to a logical ZERO and the output of invertor 146 in turn falls to a logical ZERO.

The values of the capacitor 166 and the resistor 162 are selected to keep the input of invertor 164 at a logical ZERO voltage and thereby keep LED 158 latched for approximately twelve seconds. Thus following cessation of movement of the fishing line LED 158 remains lit for a further twelve seconds.

The decay time of capacitor 144 and resistor 142 is selected to be approximately 10 seconds such that if there is a second bite within half a minute of a first bite the sensitivity of the circuit will be greater.

If there are a plurality of bites following one after the other with little delay the LED's 150 and 158 will flash and the tone sounder 184 will sound at a rate proportional to the rate at which the fishing line is being moved.

FIG. 5 shows a different form of sensing device comprising a piezo-electric crystal which may be used in the electronic circuit of FIG. 4. In this arrangement the stylus 46 is coupled to a peizo-electric device 200 mounted on an inner wall of the casing 10. The piezoelectric crystal 200 is shunted by a resistor 202 and has its output fed to the input 104 of the two input amplifier 106.

Input 104 of amplifier 106 is connected to both the output of the piezo-electric device 200 and via a resistor 204 to the positive supply line 110 for the indicator. Input 112 of amplifier 106 is connected to the negative line 114 by resistors 206 and 208 and a capacitor 209 as shown. Resistors 204 and 208 act as voltage divider maintaining the voltages on the inputs 104 and 112 of amplifier 106 such that in the rest state of the circuit (device 200 not producing an output voltage) the output of amplifier 106 is held at a steady DC voltage in the range of 3-4 volts.

With this modified arrangement movement of the stylus 46 sufficient to cause the piezo-electric crystal to generate an output voltage will cause the output of amplifier 106 to switch transistor 128 in the way described above with reference to FIG. 4, and will not further be described.

FIG. 6 illustrates another form of electronic circuit which may be used in the indicator and it is described making use of a mercury vibration switch such as that sold by Messrs. Saunders-Roe of Hayes, Middlesex, England under the Trade Name JITTER SWITCH (their part number 1812002).

In this arrangement the switch 210 is suspended in the casing on one end of the stylus 46 which, as shown is pivotably mounted at 212.

The switch 210 is coupled in series with a resistor 214 across the positive and negative supply lines 216 and 218 as shown and the junction of switch 210 and resistor 214 is connected via a blocking capacitor 220 to the junction of a pair of diodes 222 and 224. These two diodes are connected — as were the diodes 126 and 126' in the arrangement of FIG. 4 — to act as a diode pump and provide half wave rectification of the oscillating signal passed by capacitor 220.

Diode 224 is connected to line 218 by capacitor 225 and via resistor 226 to the base of a transistor 228 the collector of which is connected to line 216 by serially connected fixed and variable resistors 230 and 232 respectively as shown. The emitter of transistor 228 is connected to the negative power supply line 218 as shown.

The junction of resistor 230 and variable resistor 232 is connected to the input of an invertor 234 the output of which is connected to drive the rest of the circuitry. The input of invertor 234 is further connected as shown to the negative supply line 218 by a capacitor 235.

The output of invertor 234 is connected first via diode 236 to the input of an invertor 238 acting as a driver for an LED 240, second by a diode 242 and manually operable latching switch 244 to the junction of diode 224 and resistor 226, third via a diode 246 to the input of an invertor 248 and lastly by serially connected resistor 250 and capacitor 252 to the negative supply line 218.

The input of invertor 238 is also connected as shown to the negative supply line 218 by a resistor 254 and capacitor 256 in parallel with one another, and the output of invertor 238 is coupled by a resistor 258 to drive a first LED 240 coupled up to the positive supply line 216 as shown.

The output of invertor 248 is coupled by a resistor 260 to drive a second LED 262 coupled up to the positive supply line 216 as shown. The output of invertor 248 is additionally coupled first via a blocking diode 264 to the input of an invertor 266, second by a resistor 268 to the junction of a capacitor 270 and the input of invertor 248, and third to the input of an invertor 272.

The junction of resistor 250 and capacitor 252 is coupled to the input of an invertor 274 the output of which is coupled via a resistor 276 to the base of a transistor 278 the collector-emitter circuit of which is coupled between the input of invertor 248 and the negative supply line 218 and includes as shown a capacitor 280 in parallel with the capacitor 270.

The output of invertor 272 is coupled via a resistor 282 to a jack output 284 for the circuit as shown.

The output of invertor 266 is coupled back to the input of invertor 266 via fixed and variable resistors 286 and 288 and the junction of variable resistor 288 and the input of invertor 266 is coupled down to the negative supply line 218 by a capacitor 290 as shown. The output of invertor 266 is further coupled to drive a tone sounder to which it is coupled by a resistor 292.

As the form and function of the tone sounder circuit to which the output of invertor 266 is fed is the same as that already described with reference to FIG. 4 the parts thereof are given the same reference numerals as used with reference to that Figure. The tone sounder circuit will not now further be described.

Again as described with reference to FIG. 4 a diode 192 is provided in line 216 as shown which acts, with capacitor 168 to hold that line at the positive supply voltage (9 volts DC) when transistor 182 is conducting and tone sounder 184 is sounding.

It will be appreciated that as configured the invertor 248, resistor 268, capacitor 270 (and capacitor 280 whilst transistor 278 is ON) comprise a first free running oscillator 300 and that the invertor 266, resistor 286, variable resistor 288 and capacitor 290 comprise a second free running oscillator 302.

When switch 210 is unmoved (the fishing line is not moving) it produces varying no output and the signal on the base of transistor 228 holds transistor 28 OFF. The input of invertor 234 is therefore held at the DC Voltage level on line 216 (9 V DC) by the action of capacitor 235 and its output is held at 0 V DC. Thus the input to invertor 238 is a logical ZERO (at which level it is held by resistor 254) and its output is a logical ONE. In this condition LED 240 has no resultant bias across it and does not light.

At this time the input to invertor 274 is at a logical ZERO with the result that its output is at a logical ONE holding transistor 278 ON and putting capacitors 280 and 270 in parallel. At the same time the input of invertor 248 is at a logical ZERO. Thus the output of invertor 248 is at a logical ONE with the result that LED 262 is unlit and remainder of the circuitry is in a rest state.

When the fishing line moves switch 210 generates an oscillating output voltage which is passed by capacitor 220 and half wave rectified by diode 222 and 224 to provide a DC pulse on the base of transistor 228 which charges capacitor 225 and turns transistor 228 ON.

This enables capacitor 235 to discharge via variable resistor 232 and the collector-emitter path of transistor 228 bringing the voltage at the input of invertor 234 down to the level of line 218 in a period determined by the setting of variable resistor 232.

Thus the input of invertor 234 falls to a logical ZERO with the result that the output of this invertor switches to a logical ONE. The capacitor 256 is now charged via diode 236 bringing the input of invertor 238 to a logical ONE and as a result the output of invertor 238 switches to logical ZERO and LED 240 is lit.

Assuming no further bites are monitored by switch 210 — and latching switch 244 is open — no further pulses will be generated and capacitor 225 will discharge allowing the voltage on the base of transistor 228 to fall until transistor 228 turns OFF. In this condition capacitor 235 charges and in time the input of invertor 234 will reach the voltage level of line 216 causing its output to fall to a logical ZERO. The capacitor 256 now discharges via resistor 254 and the input of invertor 238 falls to a logical ZERO switching the output of invertor 238 to a logical ONE and turning LED 240 OFF.

If however, the bait is taken by a fish the line will continue to move holding the output of invertor 234 at a logical ONE and thus keeping LED 240 alight.

In this condition diode 246 is reversed biased and cannot conduct enabling free running oscillator 300 the frequency of which is determined by capacitors 270 and 280 (preferably of the order of 10 Hz.).

The oscillating output of free running oscillator 300 causes LED 262 to flash, enables an oscillating output to be passed by invertor 272 to the output 284 and enables free running oscillator 302. The output of free running oscillator 302 — the (audio) frequency of which is determined by capacitor 290 — drives the tone sounder circuit in the manner already described with reference to FIG. 4 and will not further be described.

If desired output 284 may used to drive a an LED or tone sounder remote from the bite indicator — a appropriate plug simply being pushed into the socket 284 to connect the bite indicator to the remote LED or sounder.

After at time in which the line has been moving capacitor 252 will become charged with the effect that transistor 278 is turned OFF and capacitor 280 removed from oscillator 300 thereby increasing the output frequency of this free running oscillator (to say 20 Hz.).

It will be seen that the circuit of FIG. 6 as so far described provides that when a fish takes the bait and runs with it LED 240 is driven to light permanently whilst LED 262 is driven to flash — initially at a relatively slow rate (say 10 Hz.) and then after a while at a higher rate (say 20 Hz.).

At the same time the tone sounder circuit is driven to sound a series of pulses initially at the lower rate and subsequently at the higher rate the pitch of the tone sounded being settable by a user varying the value of variable resistor 288 and the volume of the tone being controllable by variation of variable resistor 190.

The circuit of FIG. 6 may, however, be operated in a different manner if latching switch 244 is closed by the angler.

If latching switch 244 is closed the steady state condition of the circuit (i.e. before the fishing line has been moved) is as described above — LED 240 and LED 262 unlit and tone sounder silent. Once a fish takes the bait however, and moves the line causing LED 240 to light the logical ONE output of invertor 234 is fed back to the base of transistor 228 via diode 242 and the closed latching switch 244 holding transistor 228 ON and thus causing LED 262 to light and the tone sounder to sound.

Operation of the bite indicator in this way is especially advantageous when fishing for certain species of fish — e.g. Pike — which tend to take the bait and run with it for a short distance before stopping. This latching facility of the circuit described with reference to FIG. 6 informs an angler who has not observed a bite indication that a bite and run has taken place — that is to say that there has been activity on the line requiring his attention.

Again, the circuit described with reference to FIG. 6 provides that not only the volume and frequency of the tone sounded and the rate at which LED 262 flashes may be varied by a user but also that the pulse frequency (the output of free running oscillator 300) varies.

FIG. 7 schematically illustrates a modification which may be made to the bite indicator to enhance its operation if desired and in particular to increase the movement of the stylus in response to fishing line movement.

In this modified arrangement the indicator includes in the slot 18 a cam 304 freely rotatable on a spindle 306 extending across the slot. The outer edge of the cam 304 is recessed as shown at 308 to receive the fishing line 22 in use. The cam is aligned with the V-notch 44 in the stylus 46.

In use the fishing line 22 passes over and frictionally engages the cam such that movement of the fishing line — when a fish takes the bait causes the cam to rotate in turn causing the line to rise and fall thereby increasing the movement of the stylus and so increasing the signal generated by (or the level of modulation effected by) the sensing device to which stylus is coupled.

The cam 304 may be positioned eccentrically with respect to the spindle 306 as seen in FIG. 7 so that when it rotates it contacts and moves the stylus 46 — which can be particularly advantageous in freezing weather conditions when stylus movement may be restricted — the movement of the cam in response to line movement assuring stylus movement in all weather conditons.

It will be appreciated that modifications may be made to the described arrangements without departing from the invention. The particular circuits described are merely different implementation of circuits which may be used to bring the invention into effect. The different elements described may be replaced with other suitable elements and the particular logic system described may be replaced with any other suitable logic system.

For example, whilst various sensing devices described may be replaced with other suitable devices capable of generating (or modulating) a signal on movement or deflection of a stylus or probe — e.g Hall or Peltier Effect devices, strain gauges, or any other magnetic, electromagnetic of electrostatic device.

The tone sounder described may be any form of device actuable to emit a sound when energised — e.g. an ordinary loudspeaker, however, we prefer that this element be a piezo device as shown in view of the low current consumption such a configuration provides.

It will further be appreciated that the other described features of the embodiments shown in the drawings may be varied without departing from the scope of the present invention. However, the particular arrangements described have certain specific advantages which include the following.

It will be appreciated that the particular method of fixing the bite indicator on the bank stick enables the indicator to be mounted vertically over a wide range of angles at which the bank stick may be set — which is of particular utility in ensuring that the line runs cleanly through the narrow slot 18 — not touching the sides thereof — and so reducing to a minimum any resistance to line movement which may be sensed by a fish biting the line and detering that fish taking the bait.

The particular shape of the opening 12 — including the mouth section 14 narrower than the main part 16 of the opening has particular advantage in locating a rod 20 within the casing 10 — and prevents (without need for wings or extensions) the rod being pulled sideways out of the casing by a fish and greatly reduces the risk of the rod being blown out of the casing in high winds. Furthermore as the opening 12 is the full thickness of the casing it gives good support to the rod 20 when a fish takes the line and runs straight with it causing the rod to flex.

The provision of the flanges on the narrow slot part of the opening means that the fishing line is fed to the correct path adjacent the stylus of the sensor device without need for threading the line along a particular path (e.g. around the circumference of a wheel or pulley). Furthermore these flanges protect the stylus from damage by foreign objects which may enter the upper part of the opening — or even the upper part of the narrow slot.

The location of the LED indicators 24 adjacent the mouth part 14 of the opening 12 means that in use they are above the rod 20 and can readily be seen from either side of the bite indicator.

The provision of the knobs 26 on the outer surface of the casing 10 enabling a user to adjust the sensitivity of the indicator, as well as the pitch and volume of the tone sounder output again greatly enhances the utility of the arrangement now disclosed compared with the bite indicators known to us.

The provision of the lugs 40 enables a user to pass a line or wire attached e.g. to an alarm circuit or simply used to join a number of the users articles together thereby rendering the it more difficult for someone to steal the bite indicator.

It will be seen that the described embodiments provide a bite indicator which in use has a low power consumption (on stand by the consumption may be as low as 10 micro amps) and the sensitivity of which may readily be adjusted to take account of the type of waters being fished (the sensitivity may be reduced when fishing fast running streams and then increased when fishing still waters). Furthermore the bite indicators provide an audible and visible indication of line movement which can with the arrangement of FIG. 6 indicate to the angler what type of fish has taken the bait — the pulse repetition rate at which LED 262 flashes is slower for example if a Roach takes the bait than if the bait is taken by a Carp. Again, a bite indicator of the arrangement of FIG. 6 may by closure of the switch 244 be made to latch on to assist the angler when fishing for Pike.

We claim:

1. A fishing bite indicator including means for guiding a fishing line along a path in which it runs in abutment with a sensor operable to generate or modulate an output when moved, means for monitoring the output of the sensor and generating an audible and/or visual indication upon generation or modulation of an electrical signal by said sensor, wherein the sensor comprises a sensing device operable to generate or modulate a voltage when it is moved or vibrated and which is mounted in a sealed casing shaped to support a fishing rod and is provided with a stylus passing through a water resistant or water impermeable sheath to a position in which it abuts in use a fishing line such that movement of the fishing line will cause movement of the stylus, wherein said casing has an opening within which in use a fishing rod rests, the opening comprises a mouth part of a first width through which the rod may pass, a second part of width greater than said first width within which in use the rod rests, and a slot part of width less than said first width which receives the line associated with the rod and within which said stylus extends, the walls of said slot part being shaped to guide the fishing line into a path in which its abuts the stylus, the indicator further including a freely rotatably mounted cam member located and positioned to engage the fishing line and in use be rotated thereby when the fishing line moves, said cam member being positioned further to engage and cause movement of the stylus when the cam member is rotated.

2. An indicator as claimed in claim 1, wherein said means for providing a visual indication of line movement comprise one or more light emitting diodes mounted on the casing adjacent the mouth part of said opening.

3. An indicator as claimed in claim 2, wherein said casing has means enabling its attachment to a bank stick at an angle to the axis thereof such that the casing may be mounted vertically irrespective of the disposition of the bank stick.

4. An indicator as claimed in claim 2, wherein said attachment means comprises a ball and socket joint parts of which are formed on the casing and the bank stick respectively and which are lockable in a desired position by adjustment of a collar member.

5. An indicator as claimed in claim 4, wherein the attachment means comprises a socket formed as part of the casing and for receiving a ball member mounted on the bank stick, the collar member being threadably mounted on the bank stick adjacent the ball member.

6. An indicator as claimed in 1, wherein the means for monitoring the output of said sensor comprises an electronic circuit to which the sensor is electrically coupled and which incorporates at least one light emitting diode and driver circuit(s) therefor and a tone sounder and a driver circuit therefore, which driver circuits are activated in response to an electrical output from the sensor to energise the or each light emitting diode and the tone sounder so as to generate an audible and a visual indication of movement of the said stylus, and wherein the electronic circuit is operable in response to the output of the sensor to cause activation of first switch means, enabling the light emitting diode and tone sounder driver circuits.

7. An indicator as claimed in claim 6, wherein the electronic circuit includes an amplifier for the output of the sensor, the amplified signal so obtained being used to cause activation of said first switch means.

8. An indicator as claimed in claim 7, wherein said first switch means comprises a transistor switched between conductive and non-conductive states in response to the output of said sensor.

9. An indicator as claimed in claim 8, including second switch means operable to latch the transistor of said first switch means in a conductive state, said second switch means comprising a manual switch operable by a user of the indicator.

10. An indicator as claimed in claim 7, further including means enabling adjustment of the sensitivity of the said electronic circuit to the output of the sensor, said adjustment means comprising a variable resistor in the circuit which variable resistor may be varied by movement of an adjusting element accessable by an angler from the exterior of the casing.

11. An indicator as claimed in claim 7, wherein the circuit includes means increasing its sensitivity for a predetermined period of time following its activation, this sensitivity means comprising a capacitor which discharges in said predetermined period of time and which acts whilst charged to bias the transistor switch means conductive.

12. An indicator as claimed claim 7, further including free running oscillator circuits for driving one or both light emitting diodes and the tone sounder, which circuits are enabled in response to the output of the sensor.

13. An indicator as claimed in claim 12, wherein a light emitting diode driver circuit includes at least two invertors the outputs of which are connected across the light emitting diode, the inputs of which invertors are biased such that the light emitting diode lights for a short period each time the transistor switch means is driven conductive.

14. An indicator as claimed in claim 13, wherein the tone sounder driver circuit comprises a free running oscillator circuit biased operative and inoperative in response to the output of the sensor, and wherein the tone sounder driver circuit comprises variable resistors, enabling both the volume and the tone of the sound emitted by the tone sounder to be adjusted by a user, which resistors are adjustable to vary the oscillation rate of the free running oscillator circuit and the amplitude of the output thereof and which are adjustable by movement of adjusting elements accessible by an angler from the exterior of the casing.

15. An indicator as claimed in claim 14, wherein said sensing device comprises a vibration sensitive switch operable to generate a voltage when it is moved or vibrated.

16. An indicator as claimed in claim 14, wherein said sensing device comprises a piezo-electric crystal operable to generating a voltage when it is moved or vibrated.

17. An indicator as claimed in claim 14, wherein said sensor device comprises a light source and a light sensor the electrical output voltage of which is proportional to light incident thereon, the sensor being arranged to receive light from the light source via a light transmitting or reflecting element the position of which varies when the fishing line is moved so as to vary the level of light incident on the light sensor and thereby modulate its electrical output.

18. An indicator as claimed in claim 17, comprising an infra red light source arranged to illuminate an infra red light sensor via a transparent member having formed thereon an opaque pattern of lines, the transparent member being carried by said stylus and movable therewith upon movement of a fishing line supported by the bite indicator.

* * * * *